United States Patent
Uchimoto et al.

[11] Patent Number: 5,547,158
[45] Date of Patent: Aug. 20, 1996

[54] DEVICE FOR ADJUSTING THE SEATING LEVEL OF A VEHICLE SEAT

[75] Inventors: Daisuke Uchimoto; Hiroshi Monmasu; Toshihiko Tomita; Junsuke Inoue, all of Aki-gun, Japan

[73] Assignees: Kabushiki Kaisha Toyo Seat, Hiroshima; Mazda Motor Corporation, Hiroshima-ken, both of Japan

[21] Appl. No.: 253,485

[22] Filed: Jun. 3, 1994

[30] Foreign Application Priority Data

Jun. 4, 1993 [JP] Japan .................. 5-030036 U
Jun. 4, 1993 [JP] Japan .................. 5-134764

[51] Int. Cl.⁶ .................. B60N 1/00; F16M 11/00
[52] U.S. Cl. .................. 248/396; 248/398; 248/421
[58] Field of Search .................. 248/421, 394, 248/396, 397, 398; 297/328; 108/1, 9

[56] References Cited

U.S. PATENT DOCUMENTS

| | | | |
|---|---|---|---|
| 4,422,611 | 12/1983 | Kitsuda | 248/394 X |
| 4,533,027 | 8/1985 | Otani et al. | 248/394 X |
| 4,616,876 | 10/1986 | Suzuki et al. | 248/397 X |
| 4,787,594 | 11/1988 | Ikegaya et al. | 248/396 X |
| 4,834,333 | 5/1989 | Saito et al. | 248/421 |
| 4,986,509 | 1/1991 | Suzuki et al. | 248/396 |
| 4,995,580 | 2/1991 | Fujii | 248/394 X |
| 5,020,762 | 6/1991 | Hatta | 248/394 |
| 5,199,679 | 4/1993 | Nakamura et al. | 248/421 X |
| 5,203,532 | 4/1993 | Matsuura | 248/394 |

FOREIGN PATENT DOCUMENTS

61-150640  9/1986  Japan .

*Primary Examiner*—Karen J. Chotkowski
*Attorney, Agent, or Firm*—Fish & Richardson P.C.

[57] ABSTRACT

A seating level adjusting device includes an elevating mechanism attached on a frame of the vehicle seat for raising or lowering the seating level, and a handle assembly separatably connected with the elevating mechanism for manipulating the elevating mechanism. The handle assembly carries an actuating mechanism for actuating the elevating mechanism, a locking mechanism for locking the actuating mechanism, and a releasing mechanism for releasing the lock state of the actuating mechanism. When repairing one of the actuating, locking, and releasing mechanisms, the handle assembly is separated from the elevating mechanism. The repair can be easily accomplished.

20 Claims, 8 Drawing Sheets

DEVICE FOR ADJUSTING THE SEATING LEVEL OF A VEHICLE SEAT

BACKGROUND OF THE INVENTION

This invention relates to a device for adjusting the seating level of a vehicle seat.

A vehicle seat has recently been proposed which is provided with a sealing level adjusting device. Such seating level adjusting devices enable the driver to adjust the seating level according to the need, for example, to attain a proper driving view. Japanese Unexamined Utility Model Publication No. 61-150640 discloses one of such seating level adjusting devices.

Generally speaking, conventional seating level adjusting devices have an elevating mechanism, actuating mechanism, locking mechanism, and releasing mechanism. The elevating mechanism and the locking mechanism are attached to a seat frame. The actuating mechanism and the releasing mechanism are carried by a manipulating handle. Such arrangement makes the construction more complicated, increases the number of parts, and needs skilled persons for construction. Further, separation for repair or maintenance has been cumbersome because of complicated construction.

Particularly, the arrangement where the locking mechanism is attached on the seat frame while the releasing mechanism is provided in the manipulating handle has made the construction and separation more complicated. This is because 1) the locking mechanism and the releasing mechanism are closely related to each other in the aspect of operation, and 2) the locking mechanism is attached on the seat frame which cannot be easily handled.

Accordingly, there have been demands for a seating level adjusting device which assures easy construction and separation as well as easy manipulation.

SUMMARY OF THE INVENTION

It is an object of the invention to provide a device for adjusting the seating level of a vehicle seat which has overcome the aforementioned problems in the prior art.

It is another object of the invention to provide a seating level adjusting device which is simple in construction and makes it possible to easily adjust the seating level with one hand.

It is another object of the invention to provide a seating level adjusting device which enables easy construction and separation.

According to the present invention, a device for adjusting the seating level of a vehicle seat, comprises an elevating mechanism attached to a frame of the vehicle seat for raising or lowering the seating level; a handle assembly separatably connected with the elevating mechanism for manipulating tile elevating mechanism, the handle assembly including: an actuating mechanism for actuating the elevating mechanism; a locking mechanism for locking the actuating mechanism; and a releasing mechanism for releasing the locked state of the actuating mechanism.

The elevating mechanism may be constructed by a link mechanism and a drive shaft for driving the link mechanism. The actuating mechanism may be constructed by an actuating shaft removably connectable with the drive shaft of the elevating mechanism and an actuating lever member fixedly connected to the actuating shaft.

Also, the drive shaft may be formed with a connection boss having teeth in an outer surface thereof. The actuating shaft may be formed with a connection hollow having teeth in an inner surface of the connection hollow to engage the teeth of the connection hollow with the teeth of the connection boss.

Further, the locking mechanism may be constructed by a stationary member loosely mounted on the actuating shaft, the stationary member being held in a fixed position relative to a rotation of the actuating shaft, and having an engaging portion; a pivot member fixedly attached on the actuating lever member, the pivot member being parallel with an axis of the actuating shaft; a locking member pivotally mounted on the pivot member, and having an engaging portion engageable with the engaging portion of the stationary member. Also, the releasing mechanism may be constructed by a releasing lever member rotatably mounted on the actuating shaft, the releasing lever member being movable from a first position to a second position, and vice versa; and a contact member fixedly provided on the releasing lever member, the contact member being operable to come into contact with the locking member, the contact member pressing the locking member onto the stationary member to engage the engaging portion of the locking member with the engaging portion of the stationary member when the releasing lever member is in the first position while allowing the locking member to move away from the stationary member to disengage the engaging portion of the locking member from the engaging portion of the stationary member when the releasing lever member is in the second position.

It may be appreciated to further provide a spring for biasing the locking member in a direction of moving away from the stationary member. Further, the locking member may be formed with a contact surface along which the contact member of the releasing lever member moves, the contact surface having a locking contact surface which the contact member is in contact with when the releasing lever member is in the first position, and a releasing contact surface which the contact member is in contact with when the releasing lever member is in the second position.

It may be appreciated to further provide on the releasing mechanism a spring for biasing the releasing lever member in a direction of coming into the first position. The spring may be held by a retaining member removably attached on an outer end of the actuating shaft for keeping the stationary member and the releasing lever member from slipping off from the actuating shaft. The retaining member may be formed with a ring portion for keeping the stationary member and releasing lever member from slipping off from the actuating shaft: and a plurality of spring holding portions extending radially outward from the ring portion for holding the spring, one of the plurality of spring holding portions extending radially outward greater than the other spring holding portions.

It may be appreciated to further provide a fixing member fixedly attached on the seat frame for holding the stationary member in the fixed position; a guide member provided on the seat frame; a guide projection provided on the actuating lever member, the guide projection being formed at such a position that the guide projection slides the guide member and the stationary member engages the fixing member when the actuating lever shaft is set in a specified position.

With thus constructed seating level adjusting device, the handle assembly carrying the actuating mechanism, locking mechanism, and releasing mechanism can be separated from the elevating mechanism attached on the seat frame. Accordingly, even if one of the actuating, locking, and releasing mechanisms has trouble, checking and repair can be easily accomplished because they are separated from the seat.

The handle assembly is connected with the drive shaft of the elevating mechanism, Accordingly, the driving force or the hand can be transmitted directly to the elevating mechanism. Also, the drive shaft and actuating shaft are connected with each other by the teeth engagement, which ensures no-slip transmission of the actuating force.

The pivotal locking member is controlled by the contact member attached on the releasing lever member. The releasing lever member is rotatably mounted on the actuating shaft. In other words, the releasing lever member and the actuating lever member are coaxially arranged on the same shaft. Accordingly, the lock releasing and elevation actuating can be performed continuously. Also, the locking member which is biased in the disengaging direction ensures quick disengagement of the locking member. Further, the locking member which is formed with the locking contact surface and the releasing contact surface ensures smooth locking and releasing.

The releasing lever member is biased in the locking direction by the spring, which automatically returns the releasing lever member, Also, this will give an increased reliability to the locking mechanism. The retaining member having the ring portion and the spring holding portions can hold the spring in the specified position while keeping the stationary member of the locking mechanism and the releasing lever member from slipping off. This will eliminate special parts to hold the spring, and reduce the axial projection of the handle assembly.

The actuating lever member is further provided with guide projection. The guide projection will make easier the engagement of the stationary member with the fixing member provided on the seat frame. Accordingly, the connection of the handle assembly with the elevating mechanism can be accomplished smoothly.

These and other objects, features and advantages of the invention will become more apparent upon a reading of the following detailed disclosure of the preferred embodiments with reference to the appended drawings.

DETAILED DESCRIPTION OF THE PREFERRED EMBODIMENTS OF THE INVENTION

Figure 1:
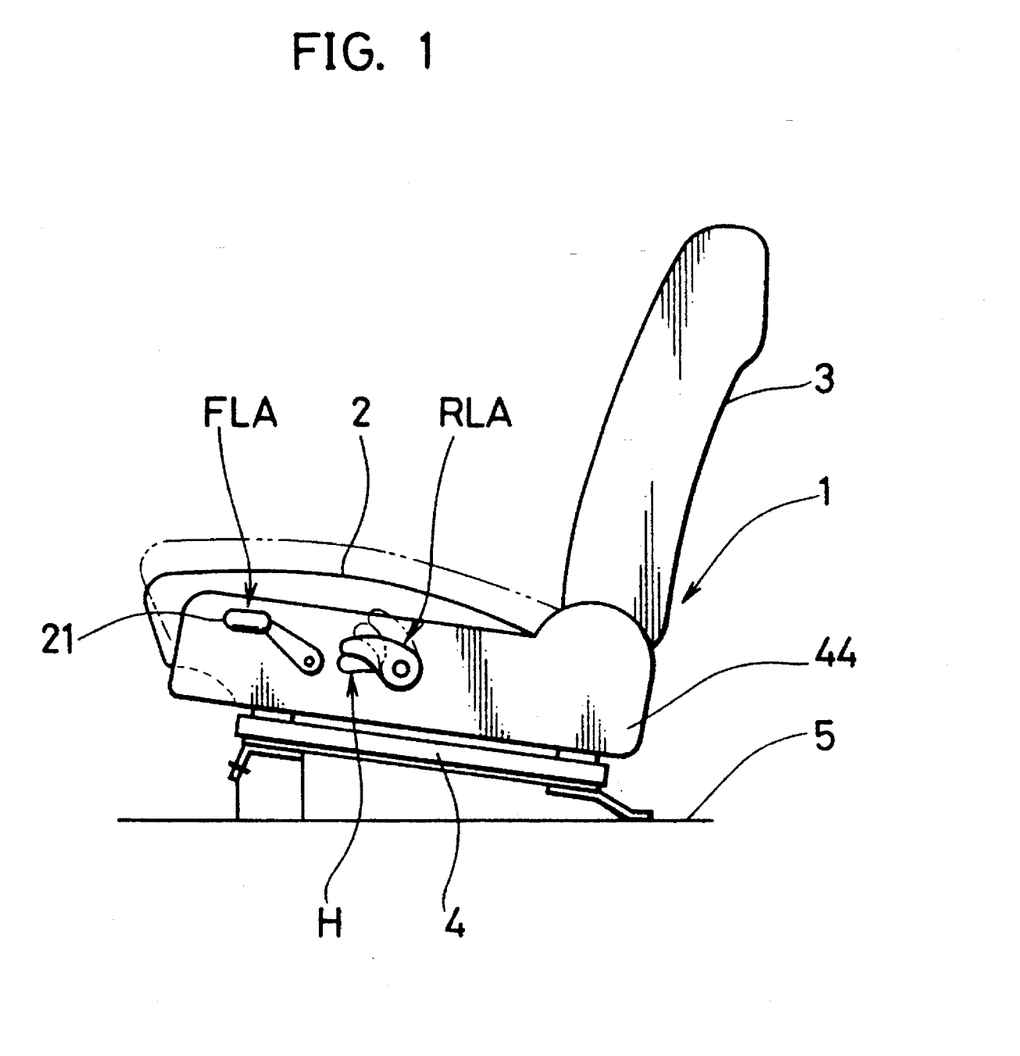
FIG. 1 is a side elevation view of a vehicle seat provided with a seating level adjusting device of the present invention.

A preferred embodiment of the present invention will be described with reference to the accompanying drawings. FIG. 1 is a side elevation view of a vehicle seat 1 which is provided with a seating level adjusting device of the present invention.

The vehicle seat 1 includes a seat cushion 2 and a seat back 3. The vehicle seat 1 is mounted on a slider 4 attached on a floor 5 of a vehicle body. The slider 4 is adapted for adjusting the back and forth position of the vehicle seat 1.

The vehicle seat 1 is provided with a rear level adjuster RLA for adjusting the rear seating level of the seat cushion 2 and a front level adjuster FLA for adjusting the front seating level of the seat cushion 2. In this embodiment, the present invention is applied to the rear level adjuster RLA.

Figure 2:
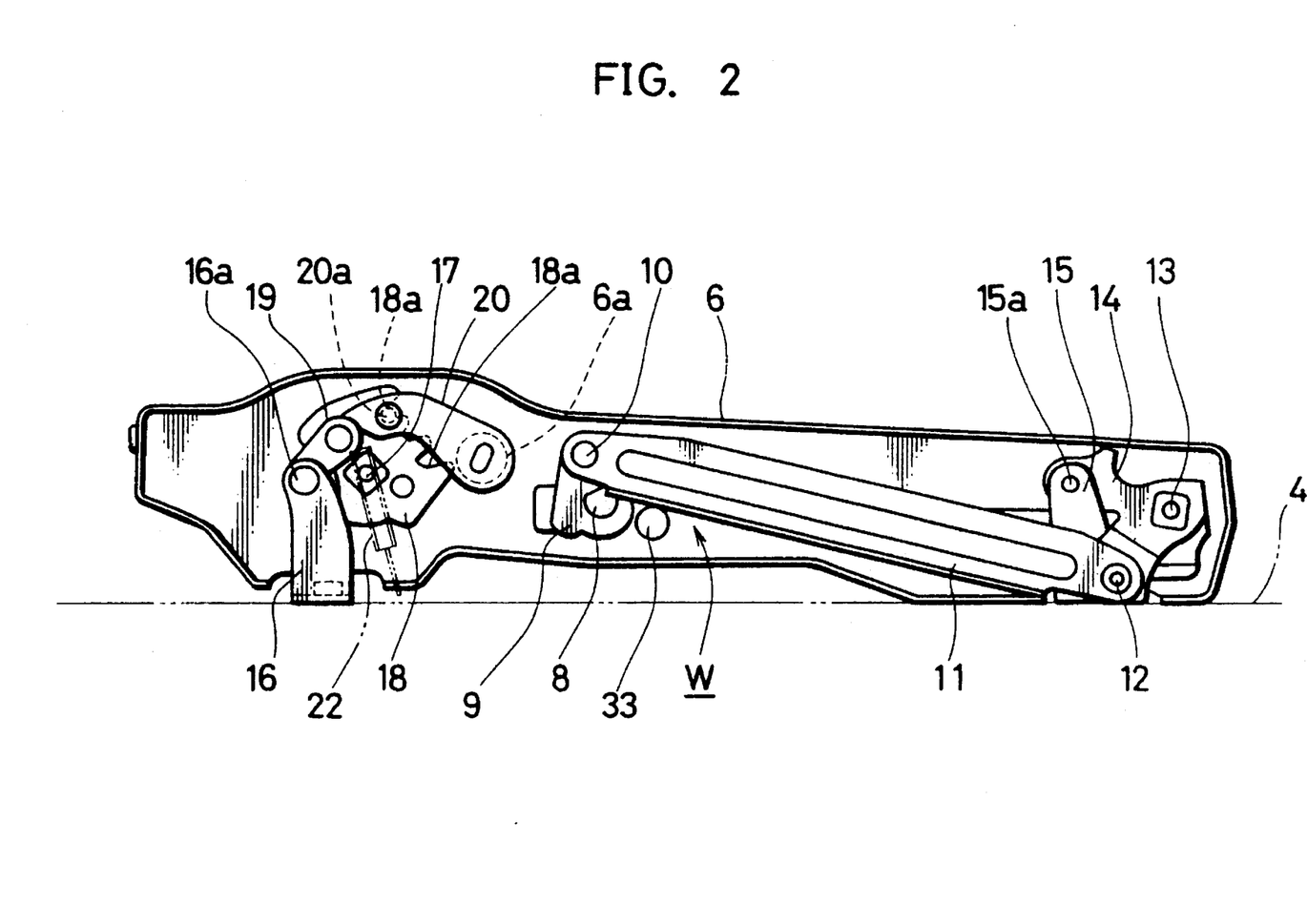
FIG. 2 is a cross sectional view of a seat cushion of the vehicle seat.

The front seating level adjuster FLA includes, as shown in FIG. 2, a swing member 18 and a lock lever 20. The swing member 18 is connected with a bracket 16 by way of a link member 19 so that the swing member 18 is swingable about a pivot pin 16a of the bracket 16. The bracket 16 is fixedly attached on the slider 4. Also, the swing member 18 is connected with a frame 6 of the seat cushion 2 by way of a connecting shaft 17 attached to the seat cushion frame 6. Further, the swing member 18 is formed with a plurality of recesses 18a in an end portion in opposite to the link member 19.

The lock lever 20 is pivotally mounted on a pin 6a attached on the seat cushion frame 6 and also provided with a lock pin 20a at a free end thereof. The lock pin 20a is fittable in a selected one of the plurality recesses 18a of the swing member 18 to lock the swing member at a fixed position. The lock lever 20 is connected with a handle 21 positioned on an outer side of the seat cushion 2. Indicated at 22 is a spring for biasing the swing member 18 in the locking direction.

The level of a front portion of the seat cushion 2 is adjusted by manipulating the handle 21 to release the lock pin 20a from the swing member 18, lifting or lowering a front end of the seat cushion 2 by hand to a desired level, and fitting the lock pin 20a in a selected one of the plurality of recesses 18a of the swing member 18 again. During the lifting or lowering of the seat cushion 2, the swing member 18 swings about the pivot pin 16a in accordance with a change of the shaft 17.

The rear level adjuster RLA includes an elevating mechanism W for lifting or lowering a rear portion of the seat cushion 2, an actuating mechanism X for actuating the elevating mechanism W, a locking mechanism Y for locking the elevating mechanism W to keep the rear portion of the seat cushion 2 at a desired level, and a releasing mechanism Z for releasing the locked state of the elevating mechanism W.

The elevating mechanism W is clearly shown in FIG. 2, and includes a first swing member g, a link member 11 pivotally connected with the swing member 9 at a pivot pin 10, second swing member 14 pivotally connected with the link member 11 at a pivot pin 12 and pivotally connected with a bracket 15 fixedly attached on the slider 4. The first swing member 9 is fixedly mounted on a drive shaft 8 which is rotatably mounted on the seat cushion frame 6. Accordingly, the swing member 9 swings or rotates together with rotation of the drive shaft 8. The second swing member 14 is connected with the seat cushion frame 6 by a connecting shaft 13 attached on the seat cushion frame 6.

Figure 3:
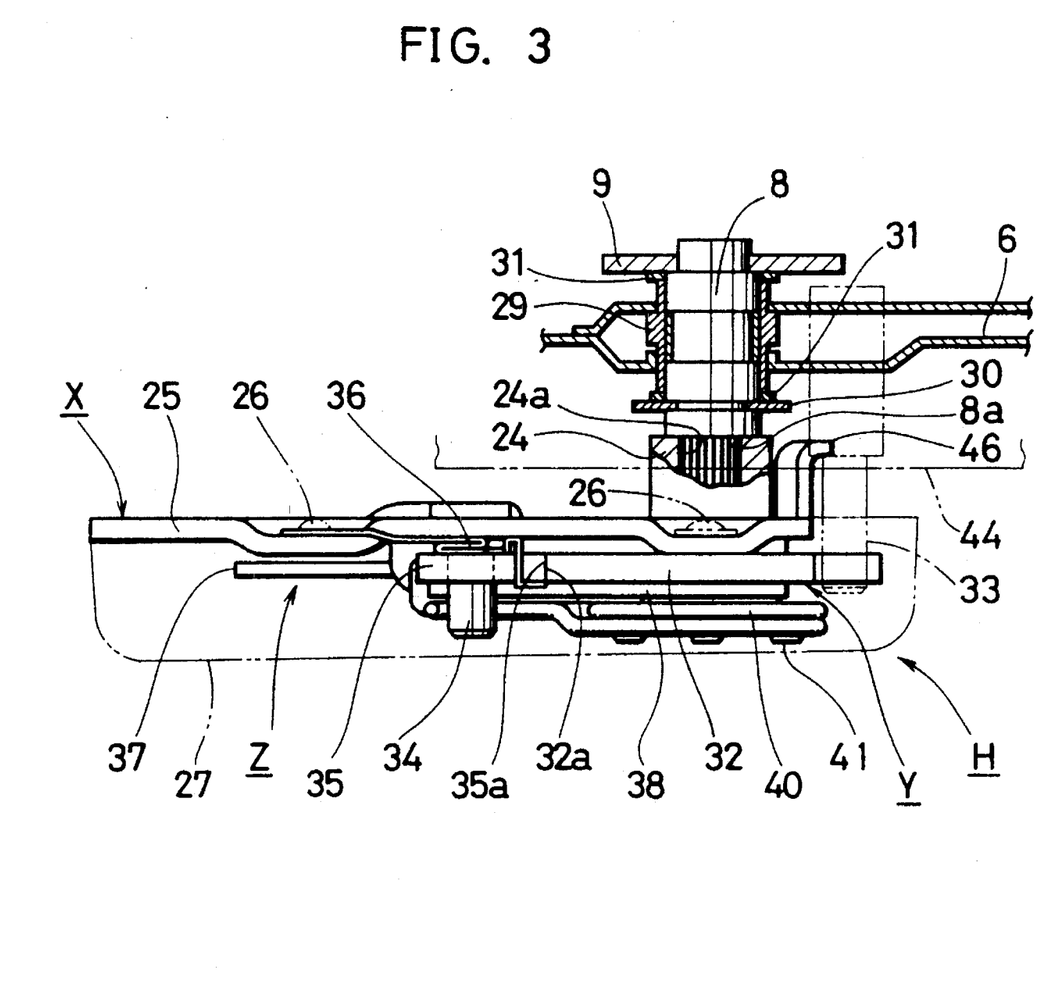
FIG. 3 is a laterally sectional view showing a handle assembly of the seating level adjusting device, the handle assembly being connected with a seat frame, with a cover being removed off.

The drive shaft 8 is, as shown in FIG. 3, rotatably mounted on the seat cushion frame 6 by use of a spacer ring 29. E-ring 30, and bush bearings 31. Also, the drive shaft 8 has a boss 8a on an outer end thereof. The boss 8a formed with teeth in a circumferential surface. The boss 8a is used for connection with the actuating mechanism X, which will be described later.

A rear portion of the seat cushion 2 is lifted by rotating the drive shaft 8 in a clockwise direction. Specifically, the clockwise rotation of the drive shaft 8 rotates or swings the first swing member 9 in a clockwise direction, moving the link member 11 in a rearward direction, and rotating the second swing member 14 in a counterclockwise direction about the pivot pin 15a. Consequently, the connecting shaft 13 rises and the seat cushion frame 6 consequently rises.

It should be noted that there is provided on the other side of the seat cushion 2 the same construction as shown in FIG. 2 to ensure a balanced lifting or lowering except for the drive shaft 8 being replaced with a pivot pin.

Next, the actuating mechanism X, locking mechanism Y, and releasing mechanism Z will be described with reference to FIGS. 3 to 9.

The actuating mechanism X, locking mechanism Y, and releasing mechanism X are, as shown in FIG. 3, assembled into one part or a handle assembly H.

The actuating mechanism X includes an actuating lever member 25 and a shaft 24 fixedly connected with the actuating lever member 25. The shaft 24 has a toothed hollow portion 24a engageable with the toothed boss 8a of the drive shaft 8. The teeth are formed in the inner surface of the hollow portion 24a of the shaft 24 and in the outer surface of the boss 8a of the shaft 8 to enable teeth engagement between the hollow portion 24a and the boss 8a. The teeth engagement will ensure firm connection between the actuating shaft 24 and the drive shaft 8, which makes rotation of the actuating lever member 25 to be assuredly transmitted to the drive shaft 8.

Figure 4:
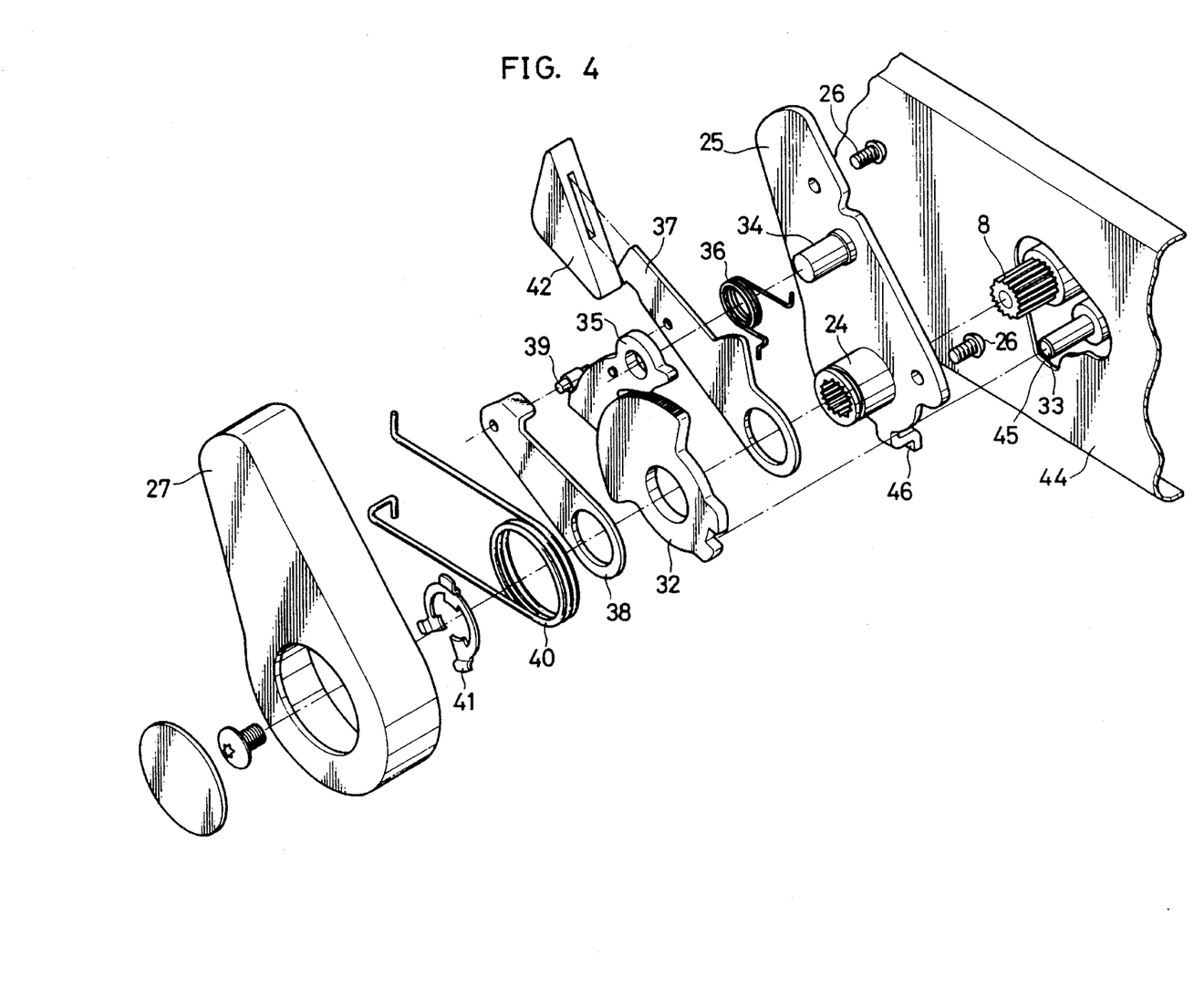
FIG. 4 is an exploded perspective view showing parts of the handle assembly.

The actuating lever member 25 is shaped into a form which can be easily gripped by one hand as shown in FIG. 4. The actuating lever member 25 is provided with a pivot pin 34 at an appropriate position between a free end and a pivotal end of the actuating lever member 25.

Further, the actuating lever member 25 is formed with a stopper projection 43 on a rearward end. The stopper projection is projected in an outer direction, and comes into contact with a portion of the locking mechanism Y to prevent the actuating lever member 25 from rotating further. In other words, the stopper projection 43 defines an upper limit of the actuating lever member 25.

The locking mechanism Y includes a stationary member 32 loosely mounted on the actuating shaft 24 and a locking arm 35 pivotally mounted on the pivot pin 34 provided on the actuating lever member 25.

The stationary member 32 has a teeth portion 32a on a forward side and a fork portion 32b on a rearward side thereof. The fork portion 32b defines a recess for allowing a fixing rod 33 attached on the seat cushion frame 6 to pass. The stationary member 32 is held from being rotated about the shaft 24 by the fixing rod 33 passed through the recess of the fork portion 32b.

The locking arm 35 has on a rearward side a teeth portion 35a meshable with the teeth portion 32a of the stationary member 32. The locking arm 35 is further formed with a locking contact surface 35b and a releasing contact surface 35c on a forward side.

A biasing spring 36 is provided in a pivotal portion of the locking arm 35 to urge, under free state, the locking arm 35 in such a direction that the teeth portion 35a moves away from the teeth portion 32a.

It will be seen that the engagement of the teeth portion 35a of the locking arm 35 with the teeth portion 32a of the stationary member 32 keeps the actuating lever member 25 from swinging, and then holds the actuating shaft 24 from rotating. The keeping of the actuating shaft from rotating maintains the seat cushion frame 6 at a previously set position, that is, the locked state.

The releasing mechanism Z includes a releasing lever member 37, a reinforcing member 38, and a contact pin 39 between the releasing lever member 37 and the reinforcing member 38. The releasing lever member 37 and the reinforcing member 38 are loosely mounted on the actuating shaft similarly to the stationary member 32, and combined by the contact pin 39. Accordingly, the releasing lever and reinforcing members 37 and 38 are integrally swingable about the actuating shaft 24.

Figure 6:
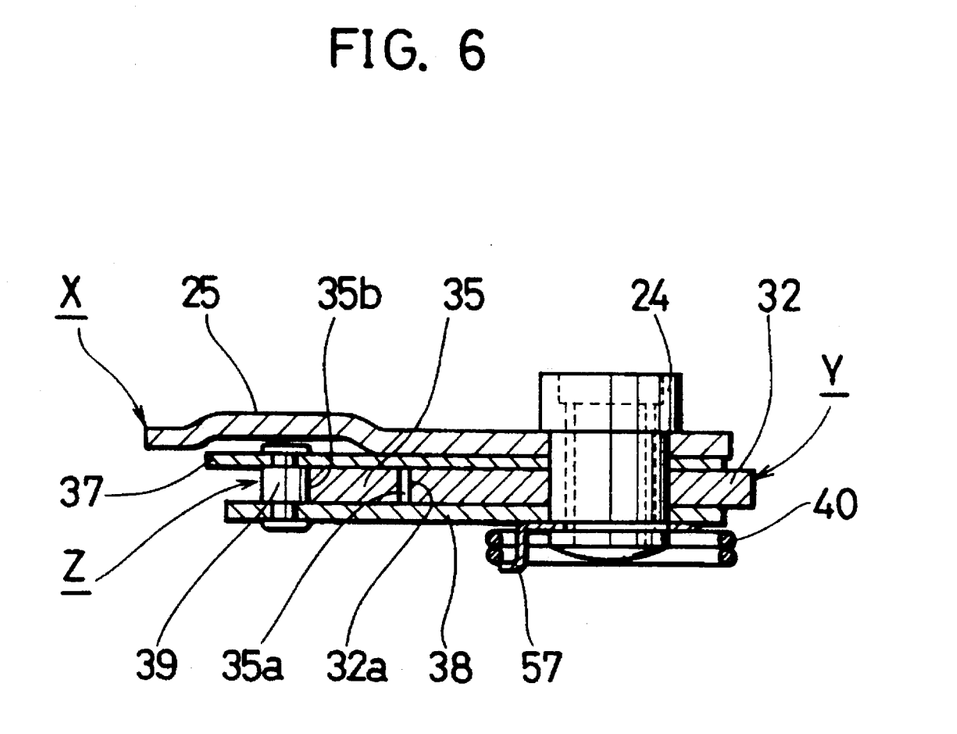
FIG. 6 is a sectional view taken along the line VI—VI in FIG. 5.

The releasing lever member 37 extends nearly to the free end of the actuating lever member 25 while the reinforcing member 38 extends just beyond the contact pin 39. The stationary member 32 and locking arm 35 of the locking mechanism Y are sandwiched between the releasing lever member 37 and the reinforcing member 38 of the releasing member Z as shown in FIG. 6.

The releasing mechanism Z is biased downward by a spring 40 whose one end is placed on the pivot pin 34 and whose the other end is placed near a free end of the reinforcing member 38. The biasing spring 40 is also attached on the actuating shaft 24 as follows.

Figure 7:
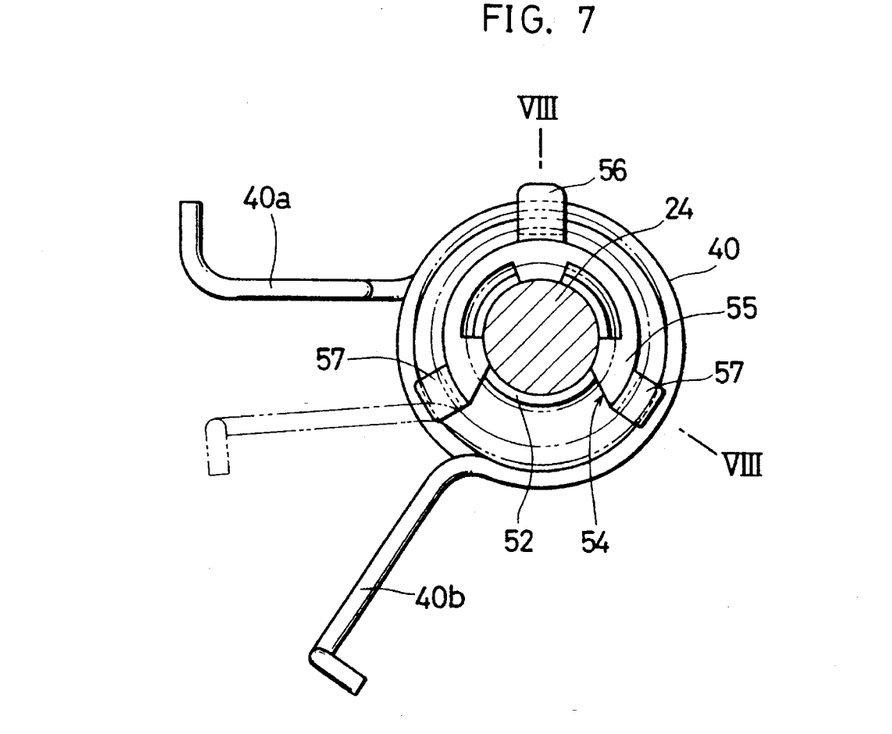
FIG. 7 is a side elevation view showing a spring mounted on an actuating shaft.
Figure 8:
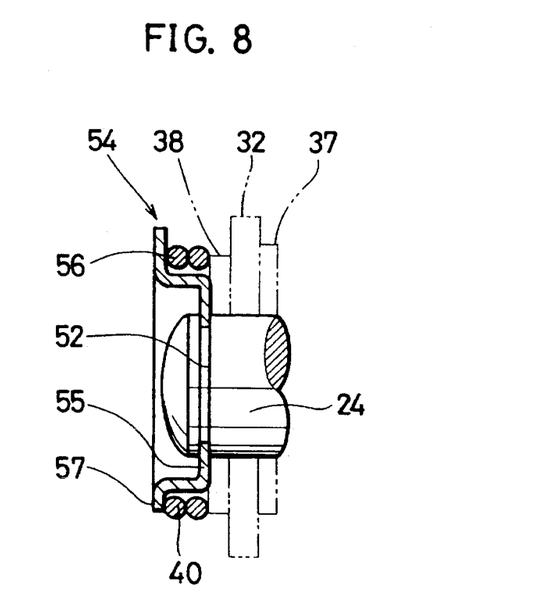
FIG. 8 is a sectional view taken along the line VIII—VIII in FIG. 7.

As shown in FIGS. 7 and 8, an outer end of the actuating shaft 24 is formed with an annular groove 52 in which a retaining member 54 is fitted to retain the stationary member 32, releasing lever member 37, reinforcing member 38, and the spring 40 on the actuating shaft 24.

The retaining member 54 has a ring portion 55 and three holding portions 56, 57, 57. The ring portion 55 is in the form of an E-ring having a space section. The ring portion is fitted in the annular groove 52 of the actuating shaft 24.

The holding portions 56, 57 are adapted for holding the spring 40. The three holding portions extends in radial directions and are spaced from one another in a circumferential direction at an interval of 120 degrees. Each holding portion is first bent axially outward and second bent radially outward to form an L-shaped section in the radial direction as shown in FIG. 8. The holding portions 57 extend radially outward near an inner periphery of the spring 40 in the free state while the holding portion 56 extends radially outward greater than the holding portions 57. However, the holding portions 57 extend radially outward greater than an outer periphery of the spring 40 in the compressed state.

More specifically, in FIG. 7, the spring 40 represented by solid lines shows the free state while the spring 40 represented by phantom lines shows the compressed state. The spring 40 is mounted on the retaining member 54 in the free state. In this time, the spring 40 is first hung on the holding portion 56 and passed over the other holding portions 57. The passing of the spring over the holding portions 57 is easily accomplished because the holding portions 57 extend only to the inner periphery of the free spring 40. However, there will be no likelihood that the spring 40 slips off from the retaining member 54 because the spring 40 is held by the longer extended holding portion 56. This will make the mounting of the spring 40 on the retaining member 54 easier.

After the spring 40 is mounted on the retaining member 54, the one end 40a of the spring 40 is placed on the pivot 34 provided on the actuating lever member 25 while the other end 40b is placed on the free end of the reinforcing member 38 of the releasing mechanism Z. When the other end 40b is placed on the free end of the reinforcing member 38, the spring 40 is compressed while the cylindrical portion of the spring 40 is pressed into all the three holding portions 56 and 57. Consequently, the spring 40 is firmly held by the retaining member 54.

This retaining member 54 not only keeps the stationary member 32, releasing lever member 37, and reinforcing member 38 from slipping off from the actuating shaft 24, but also holds the spring 40 in the specified position. There will be no need of providing additional parts to mount the spring 40. Accordingly, comparing to a case of providing exclusive parts, e.g., special nuts, for mounting the spring 40, the axial projection of the handle assembly H can be considerably reduced.

Figure 5:
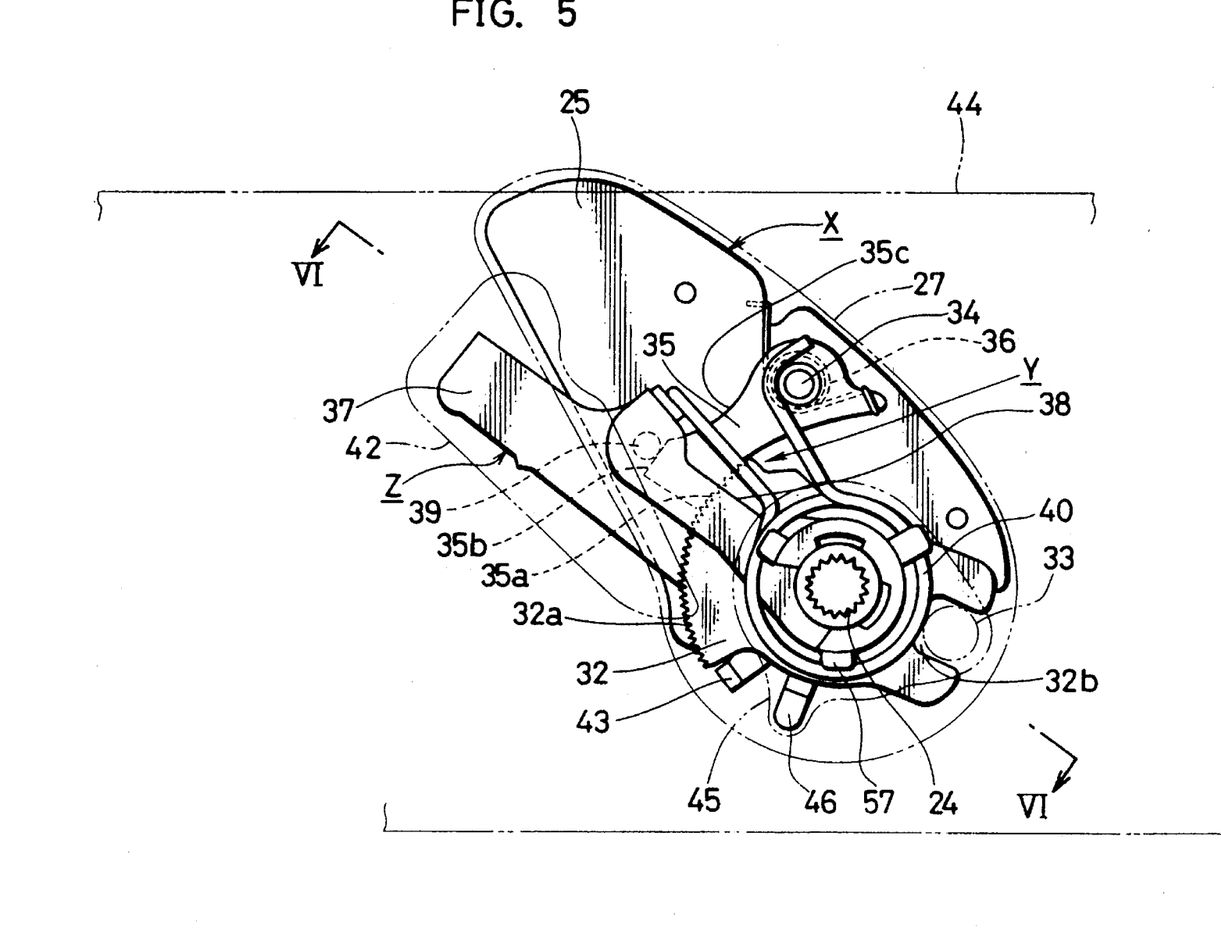
FIG. 5 is a side elevation view of the handle assembly in a locked state, the cover being removed off.

Referring now to FIG. 5, the contact pin 39 comes into contact with the locking contact surface 35b when the releasing lever member 37 is rotated downward. On the other hand, the contact pin 39 comes into contact with the releasing contact surface 35c when the releasing lever member 37 is rotated upward.

The actuating mechanism X, locking mechanism Y, and releasing mechanism Z are covered by a cover member 27. The cover member 27 is attached to the actuating lever member 25 with screws 26. Further, another cover member 42 is attached to the releasing lever member 37 of the releasing mechanism Z to cover an exposed portion of the releasing lever member 37.

Further, a guide projection 46 is formed on the actuating lever member 25 near the stopper projection 43. The guide projection 46 is projected an inner direction, and a tip portion is further bent downward. The guide projection 46 serves as a positioning guide in mounting the handle assembly H on the drive shaft 8. As shown in FIG. 5, specifically, the guide projection 46 is formed at such a position that the guide projection 46 can be inserted into or withdrawn from a seat side cover 44 of the seat cushion passing a recess 45 formed in the seat side cover 44 only when the actuating lever member 25 is in the upper limit. This position corresponds to a position to allow the fixing shaft 33 to pass the recess of the fork portion 32b of the stationary member 32. Accordingly, when mounting the handle assembly H on the drive shaft 8, the passing of the fixing shaft through the fork portion 32b of the stationary member 32 can be easily accomplished by setting the actuating lever member 25 in the upper limit, and positioning the guide projection 46 into the recess 45 formed in the seat side cover 44.

Next will be described an operation of the rear level adjuster RLA. To adjust the rear seating level of the seat cushion 2, first, the releasing lever member 37 is rotated upward against the biasing force of the spring 40 by fingers of the gripped hand. The upward rotation of the releasing lever member 37 moves the contact pin 39 from the locking contact surface 35b to the releasing contact surface 35c. Consequently, the locking arm 35 swings upward owing to the biasing force of the spring 36 so that the teeth portion 35a moves away from the teeth portion 32a of the locking arm 35.

Figure 9:
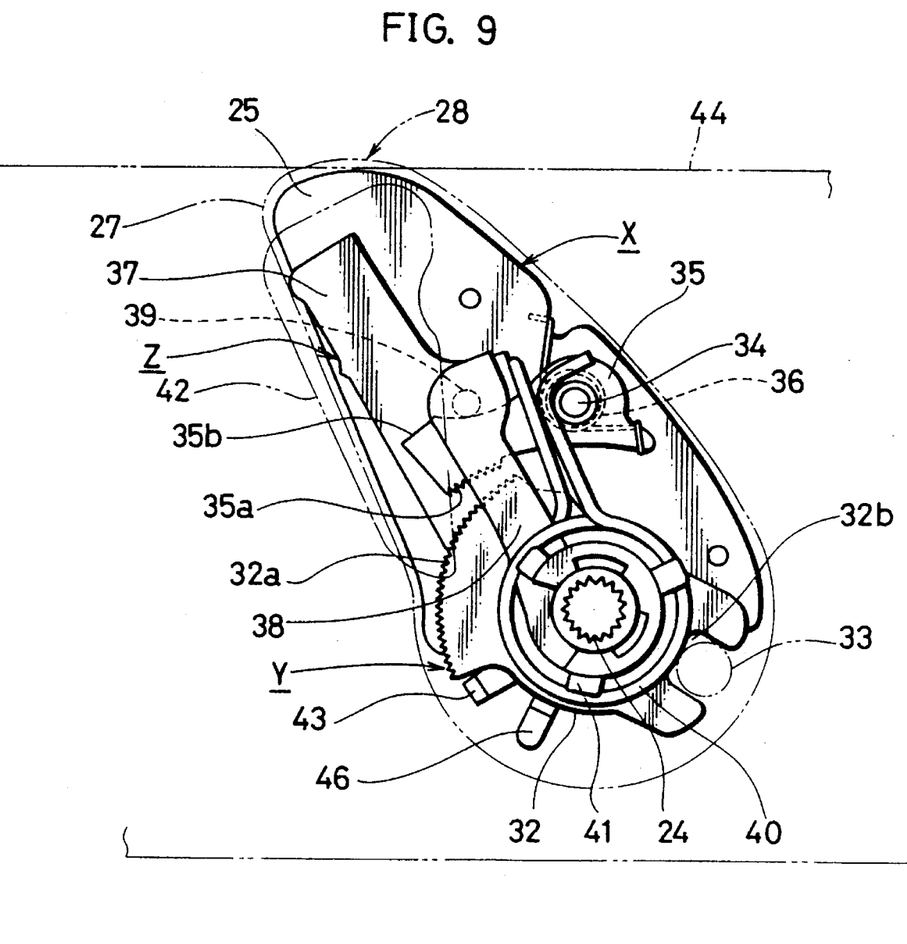
FIG. 9 is a side elevation view of the handle assembly in a released state, the cover being removed off.

FIG. 9 shows a released state of the rear level adjuster RLA in which the contact pin 39 is in contact with the releasing contact surface 35c and the teeth portion 35a is apart from the teeth portion 32 of the stationary member 32. In the released state, the actuating lever member 24 is allowed to be rotated. The rotation of the actuating lever member 25 causes a rotation of the actuating shaft 24 which is in turn transmitted to the drive shaft 8.

More specifically, an upward rotation of the actuating lever member 25 rotates the drive shaft 8 clockwise, and swings the first swing member 9 clockwise, and moves the link member 11 rearward, and swings the second swing member 14 counterclockwise, and then lifts the seat cushion frame upward.

On the other hand, a rearward rotation of the actuating lever member 25 rotates the drive shaft 8 counterclockwise, and swings the first swing member 9 counterclockwise, and moves the link member 11 forward, and swings the second swing member 14 clockwise, and then lowers the seat cushion frame 6 downward.

Upon reaching a desired seating level, the rotation of the actuating lever member 25 is stopped and the releasing lever member 37 is allowed to be rotated downward by the biasing force of the spring 40 by loosening the gripping of the releasing lever member 37. Consequently, owing to the biasing force of the spring 40, the contact pin 39 of the releasing mechanism Z moves downward along the releasing contact surface 35c while swinging the locking arm 35 toward the stationary member 32, then coming into contact with the locking contact surface 35b. In this time, the teeth portion 35a of the locking arm 35 meshes with the teeth portion 32a of the stationary member 32, which finally holds the actuating lever member 25 from rotating. In this way, the rear level adjuster RLA is placed in the locked state as shown in FIG. 5.

It should be noted that FIGS. 5 and 9 show the state where the actuating lever member 25 is rotated to the upper limit, and the stopper projection 43 is accordingly in contact with the stationary member 32.

As seen from the foregoing description, the handle assembly H carrying the actuating mechanism X, locking mechanism Y, and releasing mechanism Z is held with one hand. When adjusting the seating level, the releasing lever member 37 is gripped and the handle assembly H is rotated in a selected direction by one hand to lift or lower the seat cushion 2. After adjusting, the gripping of the releasing lever member 37 is loosened and the contact pin 39 of the releasing mechanism Z returns to the locking contact surface of the locking arm 35 to automatically attain the locked state. Accordingly, the seating level can be easily adjusted by one hand.

Also, the actuating mechanism X, locking mechanism Y, releasing mechanism Z are assembled in one body, that is, handle assembly H. This handle assembly H is removably connected with the elevating mechanism W which is mounted on the seat cushion frame 6. Specifically, the actuating shaft 24 of the actuating mechanism X is tightly attached to the drive shaft 8 of the elevating mechanism W by engaging the toothed hollow 24a with the toothed boss 8a. Accordingly, the actuating mechanism X, locking mechanism Y, releasing mechanism Z can be constructed separately from construction of the vehicle seat 1, which will thus make the construction of seat level adjuster easier and reduce the production costs.

Further, even if a trouble occurs in one of the actuating mechanism X, locking mechanism Y, and releasing mechanism Z, the trouble can be easily located and repaired. This is because the handle assembly H carrying the actuating, locking, and releasing mechanisms is easily separated from the drive shaft 8 of the elevating mechanism W and checked independently of the vehicle seat.

In the foregoing embodiment, the elevating mechanism X is adapted for lifting or lowering the rear portion of the seat cushion 2. However, according to the present invention, the elevating mechanism X may be modified so as to lift or lower the entirety of the seat cushion 2. For example, it may be appreciated to shift the position of the drive shaft 8 more forward while leaving out the front lever adjuster FLA.

Also, in the foregoing embodiment, the actuating shaft 24 and the drive shaft 8 are connected with each other by the teeth engagement. However, according to the present invention, it may be appreciated to use other engagement which makes it possible to assuredly transmit a rotation of the actuating shaft 24 to the drive shaft 8, for example, a key and key groove engagement.

What is claimed is:

1. A device for adjusting the seating level of a vehicle seat, comprising:
   an elevating mechanism attached on a frame of the vehicle seat for raising or lowering the seating level;
   a handle assembly separatably connected with the elevating mechanism for manipulating the elevating mechanism, the handle assembly including therein:
   an actuating mechanism for actuating the elevating mechanism;
   a locking mechanism for locking the actuating mechanism; and
   a releasing mechanism for releasing the lock state of the actuating mechanism.

2. A seating level adjusting device as defined in claim 1 wherein:
   the elevating mechanism includes:
   a link mechanism; and
   a drive shaft for driving the link mechanism;
   the actuating mechanism includes:
   an actuating shaft removably connectable with the drive shaft of the elevating mechanism; and
   an actuating lever member fixedly connected to the actuating shaft.

3. A device for adjusting the seating level of a vehicle seat, comprising:
   an elevating mechanism attached to a frame of the vehicle seat for raising or lowering the seating level, the elevating mechanism including a link mechanism and a drive shaft for driving the link mechanism;
   a handle assembly separatably connected with the elevating mechanism for manipulating the elevating mechanism, the handle assembly including:
   an actuating mechanism for actuating the elevating mechanism, the actuating mechanism comprising an actuating shaft removably connectable with the drive shaft of the elevating mechanism, and an actuating lever member fixedly connected to the actuating shaft;
   a locking mechanism for locking the actuating mechanism; and
   a releasing mechanism for releasing the locked state of the actuating mechanism; wherein
   the drive shaft includes a connection boss formed with teeth in an outer surface thereof; and
   the actuating shaft includes a connection hollow with teeth in an inner surface of the connection hollow, the teeth of the connection hollow being engageable with the teeth of the connection boss of the drive shaft.

4. A seating level adjusting device as defined in claim 3, wherein:
   the locking mechanism includes:
   a stationary member loosely mounted on the actuating shaft, the stationary member being held in a fixed position relative to a rotation of the actuating shaft, and having an engaging portion;
   a pivot member fixedly attached on the actuating lever member, the pivot member being parallel with an axis of the actuating shaft; and
   a locking member pivotally mounted on the pivot member, and having an engaging portion engageable with the engaging portion of the stationary member.

5. A seating level adjusting device as defined in claim 4, wherein:
   the releasing mechanism includes:
   a releasing lever member rotatably mounted on the actuating shaft, the releasing lever member being movable from a first position to a second position, and vice versa; and
   a contact member fixedly provided on the releasing lever member, the contact member being operable to come into contact with the locking member, the contact member pressing the locking member onto the stationary member to engage the engaging portion of the locking member with the engaging portion of the stationary member when the releasing lever member is in the first position while allowing the locking member to move away from the stationary member to disengage the engaging portion of the locking member from the engaging portion of the stationary member when the releasing lever member is in the second position.

6. A seating level adjusting device as defined in claim 5, wherein:
   the locking mechanism further includes a spring for biasing the locking member in a direction of moving away from the stationary member; and
   the locking member is formed with a contact surface along which the contact member of the releasing lever member moves, the contact surface having a locking contact surface with which the contact member is in contact when the releasing lever member is in the first position and a releasing contact surface with which the contact member is in contact when the releasing lever member is in the second position.

7. A seating level adjusting device as defined in claim 5, wherein the releasing mechanism further includes a spring for biasing the releasing lever member in a direction of coming into the first position.

8. A seating level adjusting device as defined in claim 7, further comprising a retaining member removably attached on an outer end of the actuating shaft for keeping the stationary member and the releasing lever member from slipping off from the actuating shaft and holding the spring.

9. A seating level adjusting device as defined in claim 8, wherein the retaining member includes:
   a ring portion for keeping the stationary member and the releasing lever member from slipping off from the actuating shaft; and
   a plurality of spring holding portions extending radially outward from the ring portion for holding the spring, one of the plurality of spring holding portions extending radially outward greater than the other spring holding portions.

10. A seating level adjusting device as defined in claim 4, wherein the locking mechanism further includes a spring for biasing the locking member in a direction of moving away from the stationary member.

11. A seating level adjusting device as defined in claim 4, further comprising:

a fixing member fixedly attached on the seat frame for holding the stationary member in the fixed position;

a guide member provided on the seat frame; and a guide projection provided on the actuating lever member, the guide projection being formed at such a position that the guide projection slides the guide member and the stationary member engages the fixing member when the actuating lever shaft is set in a specified position.

12. A device for adjusting the seating level of a vehicle seat, comprising:

an elevating mechanism attached to a frame of the vehicle seat for raising or lowering the seating level, the elevating mechanism including a link mechanism and a drive shaft for driving the link mechanism; and a handle assembly separatably connected with the elevating mechanism for manipulating the elevating mechanism, the handle assembly including:

an actuating mechanism for actuating the elevating mechanism, the actuating mechanism including an actuating shaft removably connectable with the drive shaft of the elevating mechanism and an actuating lever member fixedly connected to the actuating shaft;

a locking mechanism for locking the actuating mechanisms the locking mechanism including:

a stationary member loosely mounted on the actuating shaft, the stationary member being held in a fixed position relative to a rotation of the actuating shaft, and having an engaging portion;

a pivot member fixedly attached on the actuating lever member, the pivot member being parallel with an axis of the actuating shaft; and a locking member pivotally mounted on the pivot member, and having an engaging portion engageable with the engaging portion of the stationary member; and a releasing mechanism for releasing the locked state of the actuating mechanism, the releasing mechanism including:

a releasing lever member rotatably mounted on the actuating shaft, the releasing lever member being movable from a first position to a second position, and vice versa; and a contact member fixedly provided on the releasing lever member, the contact member being operable to come into contact with the locking member, the contact member pressing the locking member onto the stationary member to engage the engaging portion of the locking member with the engaging portion of the stationary member when the releasing lever member is in the first position while allowing the locking member to move away from the stationary member to disengage the engaging portion of the locking member from the engaging portion of the stationary member when the releasing lever member is in the second position.

13. A seating level adjusting device as defined in claim 12 wherein the locking mechanism further includes a spring for biasing the locking member in a direction of moving away from the stationary member.

14. A seating level adjusting device as defined in claim 13 wherein the locking member is formed with a contact surface along which the contact member of the releasing lever member moves, the contact surface having a locking contact surface which the contact member is in contact with when the releasing lever member is in the first position, and a releasing contact surface which the contact member is in contact with when the releasing lever member is in the second position.

15. A seating level adjusting device as defined in claim 12 wherein the releasing mechanism further includes a spring for biasing the releasing lever member in a direction of coming into the first position.

16. A seating level adjusting device as defined in claim 15 further comprising a retaining member removably attached on an outer end of the actuating shaft for keeping the stationary member the releasing lever member from slipping off from the actuating shaft and holding the spring.

17. A seating level adjusting device as defined in claim 16 wherein the retaining member includes:

a ring portion for keeping the stationary member and releasing lever member from slipping off from the actuating shaft; and a plurality of spring holding portions extending radially outward from the ring portion for holding the spring, one of the plurality of spring holding portions extending radially outward greater than the other spring holding portions.

18. A seating level adjusting device as defined in claim 12 further comprising:

a fixing member fixedly attached on the seat frame for holding the stationary member in the fixed position;

guide member provided on the seat frame;

a guide projection provided on the actuating lever member, the guide projection being formed at such a position that the guide projection slides the guide member and the stationary member engages the fixing member when the actuating lever shaft is set in a specified position.

19. A device for adjusting a seating level of a vehicle seat, comprising:

an elevating mechanism attached on a frame of the vehicle seat for raising or lowering the seating level, the elevating mechanism comprising a link mechanism and a drive shaft for driving the link mechanism;

a handle assembly separatably connected with the elevating mechanism for manipulating the elevating mechanism, the handle assembly comprising:

an actuating mechanism for actuating the elevating mechanism, comprising an actuating shaft removably connectable with the drive shaft of the elevating mechanism and an actuating lever member fixedly connected to the actuating shaft;

a locking mechanism for locking the actuating mechanism, comprising:

a stationary member loosely mounted on the actuating shaft, the stationary member being held in a fixed position relative to a rotation of the actuating shaft, and having an engaging portion;

a pivot member fixedly attached on the actuating lever member, the pivot member being parallel with an axis of the actuating shaft; and a locking member pivotally mounted on the pivot member, and having an engaging portion engageable with the engaging portion of the stationary member; and a releasing mechanism for releasing the lock state of the actuating mechanism.

20. A seating level adjusting device as defined in claim 19, further comprising:

a fixing member fixedly attached on the seat frame for holding the stationary member in the fixed position;

a guide member provided on the seat frame; and a guide projection provided on the actuating lever member, the guide projection being formed at such a position that the guide projection slides the guide member and the stationary member engages the fixing member when the actuating lever shaft is set in a specified position.

* * * * *